United States Patent [19]
Koyama

[11] Patent Number: 5,800,887
[45] Date of Patent: Sep. 1, 1998

[54] OXYGEN-ABSORBING CONTAINER

[75] Inventor: Masayasu Koyama, Zushi, Japan

[73] Assignee: Toyo Seikan Kaisha, Ltd., Tokyo, Japan

[21] Appl. No.: 568,283

[22] Filed: Dec. 6, 1995

[51] Int. Cl.[6] .................................. B29D 22/00
[52] U.S. Cl. .................. 428/36.7; 428/35.4; 428/36.6; 428/412; 428/423.1; 206/205; 206/213.1
[58] Field of Search ................ 206/205, 213.1; 428/35.4, 36.6, 36.7, 412, 423.1

[56] References Cited

U.S. PATENT DOCUMENTS 4,000,120  12/1976  Palladino et al. ................ 526/1
5,211,875   5/1993  Speer et al. ................ 252/188.25

*Primary Examiner*—Charles Nold
*Attorney, Agent, or Firm*—Sughrue, Mion, Zinn, Macpeak & Seas, PLLC

[57] ABSTRACT

An oxygen-absorbing container capable of forming active sites (polymer radicals) at any moment when it is desired to absorb oxygen remaining in the container and a method of producing packaged food using the container. A package capable of excellently preserving the content maintaining flavor can be easily produced through simple operation using an apparatus which is not so large in scale. The oxygen-absorbing plastic container has at least a portion that is made of a photo-oxidatively degradable resin or a resin composition containing a photo-oxidatively degradable resin and a photo-oxidation promoting agent that absorbs ultraviolet rays and visible light.

7 Claims, 2 Drawing Sheets

1

OXYGEN-ABSORBING CONTAINER

BACKGROUND OF THE INVENTION

1. (Field of the Invention)

The present invention relates to an oxygen-absorbing plastic multi-layer container which utilizes the light for absorbing oxygen and to a method of producing packages which effectively remove oxygen remaining in the packages by using the above containers. The invention further relates to a method of improving oxygen barrier property of the container by utilizing the light.

2. (Description of the Prior Art)

Metallic cans, glass bottles and a variety of plastic containers have heretofore been used as packaging containers. These containers are all capable of fulfilling the object of enhancing the preservability of contents to a fair degree by suppressing the permeation of oxygen through the container walls to a negligible degree. As the container is filled with the content, however, oxygen necessarily remains in the hermetically sealed package being dissolved or mixed in the content. Besides, head space necessarily exists in the uppermost portion of the container, and the air in this head space contains oxygen. Oxygen remaining in the package is considerably lean compared with oxygen in the open air but exists in amounts enough for oxidizing and degrading the content, proliferating the microorganisms, and seriously deteriorating the preservability of the content. It has been empirically known that oxygen remaining in the package is still very active even after the sterilization by heating such as hot-filling or retort sterilization. Oxygen deteriorates the flavor of the content to a conspicuous degree, too.

In order to decrease the amount of oxygen remaining in the package, means such as substitution with water vapor or substitution with nitrogen has been extensively employed at the time of producing the packages. With such physical means, however, is difficult to completely shut off the effect of residual oxygen. Therefore, the following chemical means has been employed. In order to prevent the effect of residual oxygen, reducing property of metal tin has been widely utilized from the old times and still at present. In the canned products, at least a portion of the can body or the can lid consists of an uncoated tin plate, or a tin solder is used for the side seam and is exposed to the side of the content to reduce oxygen. The applicant has already proposed the method of removing oxygen that is dissolved in the glass containers or in the plastic containers by utilizing vacuum evaporation of metal tin or lamination of a tin foil.

In order to remove oxygen in the container, an oxygen scavenger has long been used. According to this method, the oxygen scavenger is applied to the container can lid or to the container wall, in order to trap oxygen by the reaction of oxygen with the oxygen scavenger which chiefly comprises a reducing substance. The chief components of the oxygen scavenger are, in many cases, those of the iron type from the standpoint of economy and effect.

It has been known already to utilize high molecular radicals for trapping oxygen. For example, Japanese Laid-Open Patent Publication No. 207338/1987 discloses effectively trapping oxygen by irradiating an ethylene-vinyl alcohol copolymer with ionizing radioactive rays.

Japanese Laid-Open Patent Publication No. 213346/1992 discloses a container having oxygen barrier property comprising a polyolefin and a resin composition containing an oxidizing catalyst or a radical inhibitor, and further discloses that the oxygen barrier property of the container is enhanced upon irradiation with radioactive rays.

According to Japanese Laid-Open Patent Publication No. 32277/1993, at least the interior of the container comprising a laminate of a layer having oxygen barrier property and a resin layer which is formed on the inside of the oxygen barrier layer and having ability of forming high molecular radicals, is irradiated with the light or ionizing radioactive rays, the container is filled with the content before the high molecular radicals that are generated lose activity, and the container is hermetically sealed in order to absorb oxygen remaining in the container.

According to Japanese Laid-Open Patent Publication No. 194949/1993, furthermore, a resin composition containing an organic compound that can be oxidized and a transition metal catalyst is exposed to the radioactive rays to commence the trapping of oxygen.

According to the former ones of the above-mentioned prior art, oxygen in the container is trapped by a chemical reaction with reducing substances present in the container wall, and the interior of the container is maintained in a state free of oxygen. Generally, however, the reducing substances of this kind tend to migrate into the contents upon contact with the content or upon the reaction with oxygen, and adversely affect the flavor of the content or give adverse sanitary effect. For example, metal tin may abnormally elute in the content in the presence of some kinds of inorganic ions. Moreover, iron which is an oxygen scavenger impairs the flavor of the content when it is mixed even by a very small amount in the content, and is never suited for the purpose of deoxidizing the content that contains water.

The latter ones of the above-mentioned prior art utilize the principle in that the polymer radicals present in the container wall absorb oxygen. From the standpoint of life, however, the polymer radicals cannot necessarily be effectively utilized for trapping oxygen remaining in the container. Besides, there remain problems in regard to operability and cost of the apparatus.

That is, it is permitted to irradiate the containers with ionizing radioactive rays for the purpose of sterilization but it is not permitted to irradiate the foods with ionizing radioactive rays. Prior to filling the content, therefore, the container is irradiated with radioactive rays and, then, the content is filled followed by sealing. It need not be pointed out that the polymer radicals are most active just after they are generated. Therefore, the polymer radicals that are generated undergo the reaction with oxygen in the external atmosphere and are little utilized for trapping oxygen remaining in the container.

According to the prior art as described above, there exists a time gap between forming active sites (polymer radicals) for absorbing oxygen and absorbing oxygen remaining in the container, and it has been desired to form the active sites (polymer radicals) at a moment when it is desired to absorb oxygen remaining in the container. In order to enhance the preservability of the content, for instance, it has been attempted to fill the content while it is hot or to sterilize the package by heating after it is filled and sealed. With this package which is subjected to the action of the water and heat simultaneously, however, the food is deteriorated and the flavor is lost being seriously affected by residual oxygen. It is therefore desired to remove oxygen in the early stage of sealing and sterilization. However, there has not yet been known a deoxidizing method that can be used to meet this purpose.

SUMMARY OF THE INVENTION

The object of the present invention, therefore, is to provide an oxygen-absorbing container capable of forming the active sites (polymer radicals) at a moment when it is desired to absorb oxygen remaining in the container and a method of producing packaged foods using oxygen-absorbing containers.

Another object of the present invention is to provide a method of easily producing packages having excellent property for preserving the contents and excellent property for retaining the flavor through simple operation using an apparatus which is not of a so large scale.

According to the present invention, there is provided an oxygen-absorbing plastic container wherein at least part of the container wall comprises a photo-oxidation degradable resin which absorbs ultraviolet rays and visible light, or a resin composition containing the photo-oxidation degradable resin and a photo-oxidation promoting agent. In this container the part of the container wall may be a container body or a lid.

According to the present invention, furthermore, there is provided an oxygen-absorbing plastic multi-layer container wherein at least one layer of said container is an oxygen-absorbing resin layer which contains a photo-oxidation degradable resin absorbing ultraviolet rays and visible light, or contains said photo-oxidation degradable resin and a photo-oxidation promoting agent.

According to the present invention, there is further provided a method of producing packaged food comprising steps of:

filling a content to a plastic container having a layer which comprises a photo-oxidation degradable resin, or a resin composition of the photo-oxidation degradable resin and a photo-oxidation promoting agent, then sealing the container, irradiating the light having a wavelength of not shorter than 200 nm to the obtained sealed container from outside of the sealed container and, optionally sterilizing the sealed container.

According to the present invention, there is further provided a method of improving oxygen barrier property of a plastic container, wherein the plastic container is irradiated with the light having a wavelength of not shorter than 200 nm, said plastic container has a layer which comprises a photo-oxidation degradable resin, or a resin composition of the photo-oxidation degradable resin and a photo-oxidation promoting agent.

DETAILED DESCRIPTION OF THE INVENTION

Figure 1:
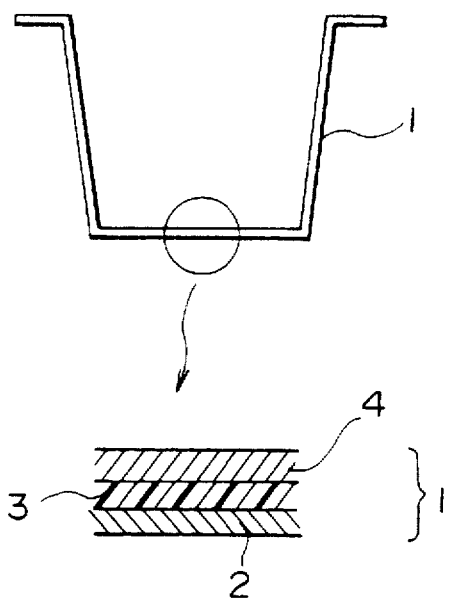
FIG. 1 is a sectional view illustrating a container of a multi-layer structure according to the present invention.

In the present invention, the photo-oxidatively degradable resin stands for the one that undergoes photo-oxidative degradation upon irradiation with the light, and particularly stands for the one of which the high molecules generate peroxy radicals in the presence of light and oxygen to undergo degradation.

Any resin can be used as the photo-oxidatively degradable resin provided the above-mentioned requirement is satisfied.

Among them, it is desired to use a resin which contains carbonyl group-containing monomer components in the main chain or side chain thereof. The most preferred example is an olefin resin composition containing 1 to 20 carbonyl groups per 100 carbon atoms.

The photo-oxidatively degradable resin can be used alone or in combination with a photo-oxidation promoting agent. It is desired that the photo-oxidation promoting agent is at least one selected from:

(a) an α-ketocarbonyl compound, (b) an amine compound, (c) a transition metal and a compound thereof, and (d) a halogen compound.

According to the present invention, it is desired that the resin composition used as an oxygen-absorbing layer contains the photo-oxidation promoting agent in an amount of from 0.1 to 5 parts by weight per 100 parts by weight of the photooxidatively degradable resin.

According to the multi-layer plastic container of the present invention, it is desired that the intermediate layers comprise a layer composed of a photo-oxidatively degradable resin and a photo-oxidation promoting agent and another gas barrier resin layer on the outer side having an oxygen permeation coefficient of not larger than 10–12 cc.cm/cm$^2$.sec.cmHg at 20° C. and 0% RH from the standpoint of absorbing oxygen remaining in the inside while shutting off the permeation of oxygen from the external side.

In the container of the present invention, the layer for absorbing oxygen remaining in the container has a photo-oxidatively degradable resin capable of absorbing ultraviolet rays and visible light, or the above photo-oxidatively degradable resin and a photo-oxidation promoting agent in combination.

The photo-oxidatively degradable resin is undergoes photo-oxidative degradation, and forms peroxy radicals upon the addition of oxygen to the polymer radicals. The oxidation proceeds automatically via the peroxy radicals to absorb oxygen. It has been known that the photo-oxidative degradation complies with the following mechanism, wherein R denotes a resin skeleton and hv denotes a light quantum.

Start of the reaction, $$R-H+h\nu \rightarrow R\cdot +H\cdot \qquad (1)$$

Addition of oxygen, $$R\cdot +O_2 \rightarrow ROO\cdot \qquad (2)$$

Extraction hydrogen, $$ROO\cdot +R-H \rightarrow ROOH+R\cdot \qquad (3)$$

Decomposition of hydroperoxide, $$ROOH \rightarrow RO\cdot +\cdot OH \qquad (4)$$

$$2ROOH \rightarrow RO\cdot +ROO\cdot +H_2O \qquad (5)$$

$$RO\cdot +R-H \rightarrow ROH+R\cdot \qquad (6)$$

Termination of the reaction, $$R\cdot +R\cdot \rightarrow R-R \qquad (7)$$

$$R\cdot +RO\cdot \rightarrow ROR \qquad (8)$$

$$RO\cdot +RO\cdot \rightarrow ROOR \qquad (9)$$

$$ROO\cdot +ROO\cdot \rightarrow ROOR+O_2 \qquad (10)$$

As will be obvious from the above equations, oxygen reacts with the radicals to generate the water, ether group, hydroxyl group and peroxy group, and react with the radical formed by cutting the main chain to generate carbonyl group. Therefore, if at least one layer of the multi-layer container or, preferably, an intermediate layer is formed by using a photo-oxidatively degradable resin and is irradiated with ultraviolet rays and visible rays at a timing most suited for absorbing oxygen in the container, it is made possible to effectively absorb oxygen in the container via polymer radicals.

Moreover, high molecular radicals having long life trapped in the resin layer captures oxygen that permeates through the resin layer, and contributes to enhancing the oxygen barrier property of the container.

The $\alpha$-position of the carbonyl group that exists on the main chain or on the side chain is easily activated by light to form a radical, and undergoes oxidative degradation while absorbing oxygen during this process.

The present invention utilizes ultraviolet rays and visible light for forming polymer radicals that serve as active sites for absorbing oxygen. Unlike that of using ionizing radioactive rays, therefore, the timing for irradiating the container with ultraviolet rays and visible right is not limited to before filling the container with the content but may be irradiated with the rays after the container is filled with the content and is sealed. Accordingly, oxygen remaining in the container can be effectively absorbed via polymer radicals.

Moreover, what is required is a light irradiation facility only, and no protective facility is needed. Therefore, operation is simple, cost of facility can be decreased, and enhanced safety is maintained.

It is advantageous to irradiate the container with ultraviolet rays and visible light after it has been filled with the content and sealed followed by sterilization by heating from the standpoint of retaining flavor of the content. That is, trapping the oxygen via polymer radicals is promoted with an increase in the temperature that results from the sterilization by heating, and residual oxygen is almost all trapped before it attacks the content. Therefore, flavor of the content is maintained at a high level even after the sterilization.

In order to enhance the efficiency for absorbing oxygen based on the photo-oxidative degradation of a resin, it is desired to (i) increase the region for absorbing wavelength, (ii) to increase of quantum yield that are formed such as active radicals, (iii) to shorten the induction period, and (iv) to increase the rate of reaction.

The above-mentioned requirements (i) to (iv) are satisfied by a resin that contains a carbonyl group-containing monomer component in the main chain or in the side chain thereof and, particularly, by an olefin resin composition which contains 1 to 20 carbonyl groups per 100 carbon atoms.

The above-mentioned requirements are satisfied even by a combination of a photo-oxidatively degradable resin and a photo-oxidation promoting agent. As the photo-oxidation promoting agent, there can be particularly preferably used at least one selected from (a) an $\alpha$-ketocarbonyl compound, (b) an amine compound, (c) a transition metal and a compound thereof, and (d) a halogen compound.

According to the present invention, the resin composition used as an oxygen-absorbing layer may contain a photo-oxidation promoting agent in an amount of from 0.1 to 5 parts by weight and, particularly, from 0.2 to 3.0 parts by weight per 100 parts by weight of the photo-oxidatively degradable resin from the standpoint of the above-mentioned characteristics.

According to the multi-layer plastic container of the present invention, it is desired that the intermediate layer comprises a layer composed of a photo-oxidatively degradable resin and a photo-oxidation promoting agent and another gas barrier resin layer on the outer side having an oxygen permeation coefficient of not larger than 10–12 cc.cm/cm$^2$ sec.cmHg at 20° C. and 0% RH from the standpoint of absorbing oxygen remaining in the inside while shutting off the permeation of oxygen from the external side.

Referring to FIG. 1 illustrating a multi-layer structure of the container of the invention, the container 1 comprises an outer layer 2 for protection composed of a thermoplastic resin, an intermediate layer 3 composed of a photo-oxidatively degradable resin or a composition of a photo-oxidatively degradable resin and a photo-oxidation promoting agent, and a heat-sealable inner layer 4 composed of a thermoplastic resin.

Figure 2:
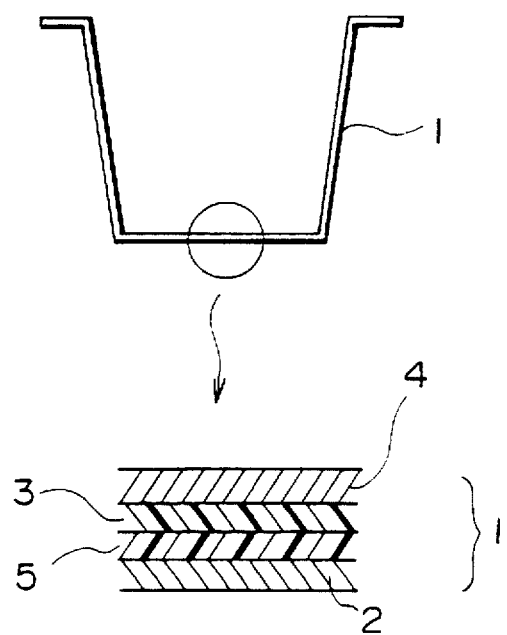
FIG. 2 is a sectional view illustrating a container of another multi-layer structure according to the present invention.

Referring to FIG. 2 illustrating another multi-layer structure of the container of the invention, the container 1 comprises an outer layer 2 for protection composed of a thermoplastic resin, a first intermediate layer 5 composed of a gas barrier resin, a second intermediate layer 3 composed of a photo-oxidatively degradable resin or a composition of a photo-oxidatively degradable resin and a photo-oxidation promoting agent, and a heat-sealable inner layer 4 composed of a moisture-proof thermoplastic resin. Attention should be given to that the second oxygen-absorbing intermediate layer 3 is formed on the inside of the gas barrier resin layer 5.

Figure 3:
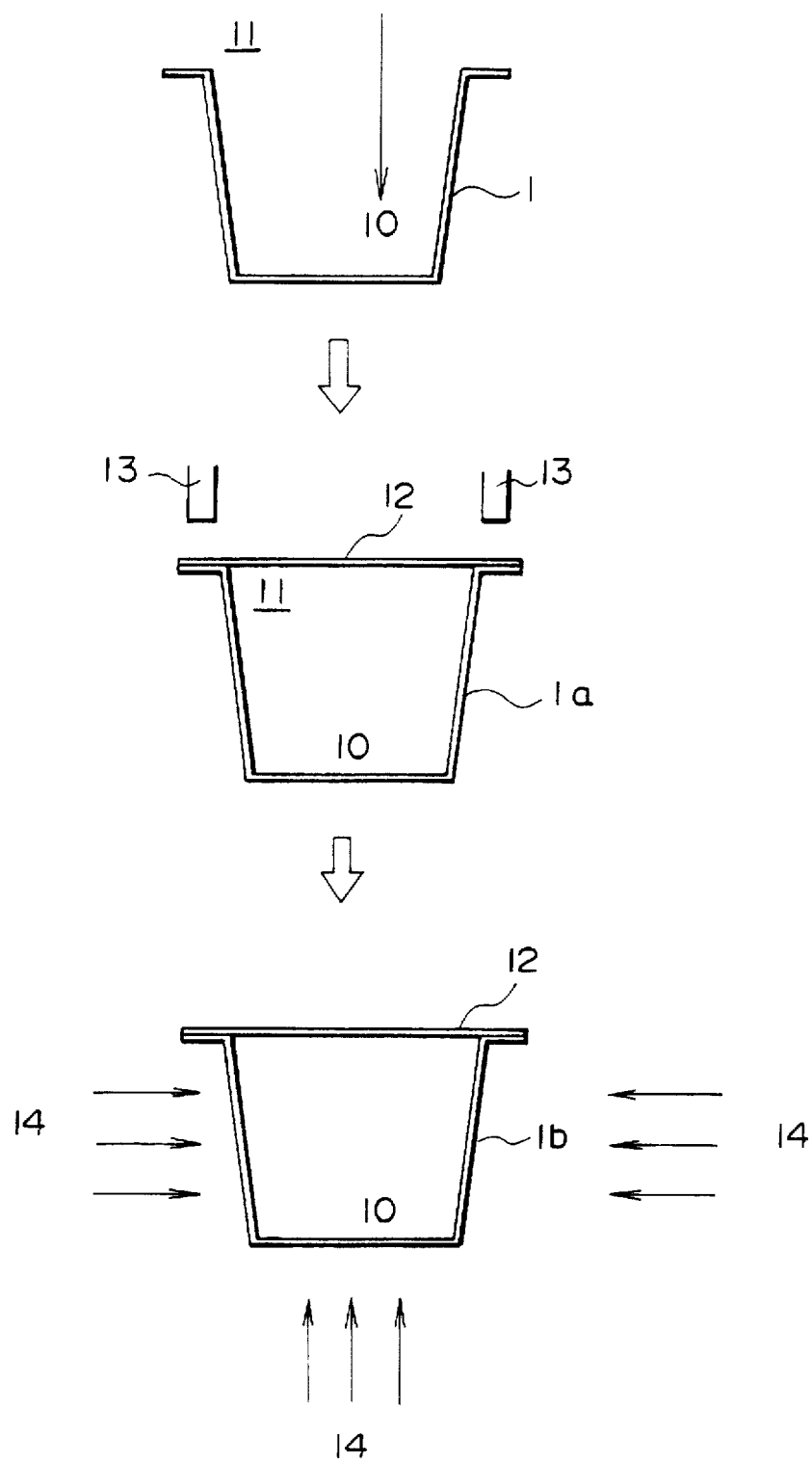
FIG. 3 is a diagram illustrating a method of producing a packaged food using the container of the present invention.

Referring to FIG. 3 explaining how to produce a packaged food using the container of the present invention, the container 1 is filled with a food 10, the atmosphere is substituted with an inert gas 11 such as water vapor or nitrogen, and a heat-sealable lid 12 is placed thereon and is sealed using a heat-sealing bar 13. Then, the sealed container 1a is irradiated with the light from a light source 14. The photo-oxidatively degradable resin of the intermediate layer 3 generates polymer radicals to absorb oxygen via peroxy radicals. The package 1b is then sterilized by heating in a sterilizer (not shown). During the sterilization by heating, oxygen remaining in the container further decreases. Sterilization by heating is finished for the content 10 in the container. Therefore, the sealed package 1b after sterilization is taken out and, as required, is cooled to obtain a product.

In the present invention, a carbonyl group-containing resin is preferably used as the photo-oxidatively degradable resin. This resin is obtained by subjecting a carbonyl group-containing monomer such as a monomer represented by the formula

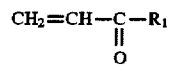

wherein R1 is a monovalent hydrocarbon group and, particularly, an alkyl group or an aryl group, or carbon monoxide to the homopolymerization, random copolymerization, graft-copolymerization or block-copolymerization. This homopolymer or copolymer may be used being blended with other resins such as olefin resin.

Suitable examples of the carbonyl group-containing resin include styrene-carbon monoxide copolymer, ethylene-carbon monoxide copolymer, polymethyl vinyl ketone, polyethyl vinyl ketone, polyisopropyl vinyl ketone, polyvinyl phenyl ketone, ethylene-methyl vinyl ketone copolymer and the like. These resins should contain the carbonyl groups at the above-mentioned concentrations.

It is allowable to use these carbonyl group-containing resins being blended with other resins. Examples of the olefin resin to be blended include low-, medium- or high-density polyethylene, linear low-density polyethylene (LLDPE), isotactic polypropylene, ethylene-propylene copolymer, polybutene-1, ethylene-butene-1 copolymer, propylene-butene-1 copolymer, ethylene-propylene-butene-1 copolymer, ethylene-vinyl acetate copolymer, ionically crosslinked olefin copolymer (ionomer), ethylene-ethyl acrylate copolymer, ethylene-vinyl alcohol copolymer, and blends thereof. Propylene polymer or copolymer generally contains a variety of additive agents such as stabilizer. In the present invention propylene polymer or copolymer which contain or does not contain the additive agents can be blended with the carbonyl group-containing resins.

Examples of the α-ketocarbonyl compound used as the photo-oxidation promoting agent include α-diketone, α-ketoaldehyde, α-ketocarboxylic acid, α-ketocarboxylic ester and the like. Concrete examples include α-diketones such as diacetyl, 2,3-pentanedione, 2,3-hexanedione, benzyl, 4,4'-dimethoxybenzyl, 4,4'-diethoxybenzyl, 4,4'-oxybenzyl, 4,4'-dichlorobenzyl, 4-nitrobenzyl, α-naphthyl, β-naphthyl, camphorquinone, and 1,2-cyclohexanedione, α-ketoaldehydes such as methylglyoxal and phenylglyoxal, as well as pyruvic acid, benzoylformic acid, phenylpyruvic acid, methyl ypruvate, ethyl benzoylformate, methyl phenylpyruvate, butyl phenylpyruvate and the like.

As the amine compound used as the photo-oxidation promoting agent, there can be used a dialkylaminobenzoic acid derivative and, particularly, an aldehyde, carboxylic acid or an ester thereof. Concrete examples include 4-dimethylaminobenzaldehyde, 4-diethylaminobenzaldehyde, 4-(methylhexylamino) benzaldehyde, 4-(methylphenylamino)benzaldehyde, 4-(β-hydroxyethylmethylamino)benzaldehyde, 4-dimethylaminobenzoic acid, 4-dimethylaminobenzoic acid, 4-(methylhexylamino)benzoic acid, 4-(methylphenylamino)benzoic acid, 4-(β-hydroxyethylmethylamino)benzoic acid, methyl 4-dimethylaminobenzoate, methyl 4-diethylaminobenzoate, methyl 4-dipropylaminobenzoate, methyl 4-(methylhexylamino)benzoate, methyl 4-(methylphenylamino)benzoate, propyl 4-(β-hydroxyethylmethylamino)benzoate, hexyl 4-dimethylaminobenzoate, phenyl 4-dimethylaminobenzoate, 4-dimethylaminophthalic acid, 4-dimethylaminoisophthalic acid and dimethyl 4-dimethylaminoisophthalate. Among these substituted aromatic amines, it is desired to use 4-dimethylaminobenzaldehyde, 4-dimethylaminobenzoic acid and methyl 4-dimethylaminobenzoate.

There can be further used a variety of aniline derivatives such as N,N-dimethyl-o-cyanoaniline, N,N-dimethyl-o-nitroaniline, N,N-dimethyl-o-chloroaniline, N,N-dimethyl-o-bromoaniline, N,N-dimethyl-o-iodoaniline, N,N-dimethyl-m-cyanoaniline, N,N-dimethyl-m-nitroaniline, N,N-dimethyl-m-chloroaniline, N,N-dimethyl-m-bromoaniline, N,N-dimethyl-p-cyanoaniline, N,N-dimethyl-p-nitroaniline, N,N-dimethyl-p-chloroaniline, N,N-dimethyl-p-bromoaniline, N,N-diethyl-o-cyanoaniline, N,N-diethyl-m-cyanoaniline, N,N-diethyl-p-cyanoaniline, N,N-diethyl-p-chloroaniline, N,N-dipropyl-p-cyanoaniline, N,N-dibutyl-p-cyanoaniline, N,N-methylphenyl-p-cyanoaniline, N,N,-β-hydroxyethylmethyl-p-chloroaniline, N,N-dimethyl-2,4,-dicyanoaniline, N,N,-dimethyl-2,4-dinitroaniline, N,N-dimethyl-2,4-dichloroaniline and the like.

Examples of the transition metal that can be used as a photo-oxidation promoting agent include cobalt, iron, nickel, copper, manganese, chrome, titanium, vanadium and the like. Among them, cobalt is preferred. It is desired that these transition metals are used as organic complexes or organic acid salts. For instance, it is desired to use acetyl acetonate complex, β-keto-acid ester complex, and higher farry acid sults such as stearate, linoleate or oleate, as well as naphthenate and dimethyl dithiocarbamate.

As the halogen compound that effectively serves as a photo-oxidation promoting agent, there can be used di- and tri-chloroacetophenone, chloroanthraquinone, chloromethyl naphthalene, and hexachlorobutadiene. There can be further used those represented by a general formula R—CH$_2$X, R—SO$_2$X (where X denotes Cl, Br or I, and R denotes a group having an unsaturated bond).

It is desired that the above-mentioned photo-oxidation promoting agents are used at a ratio as described above. They may be used in a single kind or in a combination of two or more kinds. For instance, the α-ketocarbonyl compound and amines may be used in combination.

It is desired that the oxygen-absorbing resin layer is formed in a thickness of generally from 10 to 300 μm and, particularly, from 20 to 200 μm through it may vary depending upon the oxygen-absorbing ability of the resin layer. When the thickness is smaller than the above-mentioned range, oxygen is not absorbed to a satisfactory degree. When the thickness is larger than the above-mentioned range, the container loses mechanical strength.

Though the oxygen-absorbing resin layer works to suppress oxygen from permeating through the wall, provision is further made of a gas barrier resin layer to more effectively suppress the permeation of oxygen.

As the gas barrier resin, there is used a thermoplastic resin having an oxygen permeation coefficient of not larger than $10^{-12}$ cc.cm/cm$^2$sec.cmHg at 20° C. and 0% RH and which is heat-moldable. The most preferred example of the gas barrier resin is an ethylene-vinyl alcohol copolymer such as a saponified copolymer that is obtained by saponifying an ethylene-vinyl acetate copolymer containing ethylene in an amount of from 20 to 60 mol % and, particularly, from 25 to 50 mol % in such a manner that the saponification degree becomes not smaller than 96 mol % and, particularly, not smaller than 99 mol %. It is desired that the saponified ethylene-vinyl alcohol copolymer has a molecular weight which is large enough for forming a film and, generally, has a viscosity of not smaller than 0.01 dl/g and, particularly, not smaller than 0.05 dl/g as measured in a mixture solvent of phenol:water of a weight ratio of 85:15 at a temperature of 30° C.

Other examples of the gas barrier resin having the above-mentioned properties include polyamides having amide groups in a number of 5 to 50 and, particularly, 6 to 20 per 100 carbon atoms, such as nylon 6, nylon 6,6, nylon 6/nylon 6,6 copolymer, metaxylylene adipamide, nylon 6, 10, nylon 11, nylon 12, nylon 13, etc. It is desired that these polyamides have molecular weights large enough for forming a film and have relative viscosities [ηrel] of not smaller than 1.1 and, particularly, not smaller than 1.5 as measured in a concentrated sulfuric acid of a concentration of 1.0 g/dl at 30° C. It is further allowable to use gas barrier resins such as vinylidene chloride copolymer resin, high nitrile resin, and gas barrier polyester resin.

It is desired that the gas barrier resin layer has a thickness of, generally, from 5 to 200 μm and, particularly, from 10 to 120 μm though it may vary depending upon the amount of oxygen permitted to remain in the container.

An inner resin layer is provided on the inside of the oxygen-absorbing resin layer in order to prevent direct contact between the oxygen-absorbing resin and the content. The inner resin layer should be capable of permeating oxygen to a sufficient degree so that oxygen remaining in the container is fed to the oxygen-absorbing resin layer, and should be water-insoluble so that the oxygen-absorbing resin layer is not extracted with water. From the standpoint of easily producing the containers and the sealing operation, furthermore, the inner resin layer should be capable of being heat-sealed.

As thermoplastic resins for satisfying these requirements, there can be used olefin resins such as low-, medium- or high-density polyethylene, linear low-density polyethylene (LLDPE), isotactic polypropylene, ethylene-propylene copolymer, polybutene-1, ethylene-butene-1 copolymer, propylenebutene-1 copolymer, ethylene-propylene-butene-1 copolymer, ethylene-vinyl acetate copolymer, ionically crosslinked olefin copolymer (ionomer), ethylene-ethyl acrylate copolymer, and blends thereof.

It is also possible to use low-melting nylon copolymers and copolymerizable polyester since they can be heat-sealed.

The inner resin layer may have a thickness of, usually, from 5 to 300 μm and, particularly, from 20 to 200 μm though it may vary depending upon the structure of the container and the whole thickness. When the thickness is smaller than the above-mentioned range, the inner resin layer exhibits poor resistance against extraction and heat-sealing property. When the thickness is larger than the above-mentioned range, on the other hand, the inner resin layer fails to exhibit satisfactory oxygen-absorbing property.

It is desired to provide a moisture-proof outer resin layer for protection on the outside of the oxygen-absorbing resin layer or on the outer side of the gas barrier resin layer which is formed on the outer side of the oxygen-absorbing resin layer. As the outer layer, there can be used the following resins in addition to the olefin resin layers exemplified as the inner resin layer:

polyamides such as nylon 6, nylon 6,6, nylon 6/nylon 6,6 copolymer, metaxylylene adipamide, nylon 6, 10, nylon 11, nylon 12, nylon 13 or blends thereof;

polyesters such as polyethylene terephthalate (PET), polybutylene terephthalate (PBT), polyethylene terephthalate/isophthalate (PETI), polyethylene naphthalate (PEN), etc.; and other resins such as polycarbonate, polyacrylate, acrylic resin, etc.

It is desired that the outer resin layer has a melting point higher than that of the inner resin layer from the standpoint of heat resistance. This contributes to enhancing the heat sealing operation. The outer resin layer may not be oriented or may be molecularly oriented monoaxially or biaxially.

It is desired that the outer resin layer has a thickness of, usually, from 5 to 500 μm and, particularly, from 20 to 300 μm though it may vary depending upon the structure of the container and the whole thickness.

The laminate used in the present invention is not limited to those of the three-layer type shown in FIG. 1 or the four-layer type shown in FIG. 2, but may have a laminated structure of more layers. For example, when the oxygen-absorbing resin layer and the gas barrier resin layer exhibit no adhesive property to each other or exhibit adhesive property to neither the inner resin layer nor to the outer resin layer, there may be provided adhesive resin layers to adhere them together.

As such an adhesive resin, there can be exemplified a thermoplastic resin which contains carbonyl groups

due to carboxylic acid, carboxylic anhydride, carboxylate, amide carboxylate or carboxylic ester on the main chain or on the side chain thereof at a concentration of 1 to 700 milliequivalent (meq) per 100 g of the resin and, particularly, at a concentration of 10 to 500 meq per 100 g of the resin. Preferred examples of the adhesive resin include ethylene-acrylic acid copolymer, ionically crosslinked olefin copolymer, maleic anhydride-grafted polyethylene, maleic anhydride-grafted polypropylene, acrylic acid-grafted polyolefin, ethylene-vinyl acetate copolymer, copolymerizable polyester and copolymerizable polyamide which may be used in a single kind or in a combination of two or more kinds. These resins can be laminated by being simultaneously extruded or by sandwich lamination.

An intermediate layer of a scrap resin that is by-produced at the time of producing the container can be provided between the outer resin layer and the oxygen-absorbing resin layer or the gas barrier resin layer. Moreover, a resin layer blended with an adsorbing agent can be provided as an intermediate layer between the oxygen-absorbing resin layer and the inner resin layer.

The plastic container used in the present invention can be produced by a method that has been widely known, except the above-mentioned constitution of layers. To simultaneously extrude many layers, the resins are melted and kneaded in the extruders corresponding to the resin layers and are extruded into a predetermined shape via a multi-layer multiplexed die such as T-die or circular die. Furthermore, the resins are melted and kneaded in the injection machines corresponding to the resin layers, and are injected simultaneously or successively into an injection metal mold thereby to produce a multi-layer container or a preform for container. There can be further employed such a lamination system as dry lamination, sandwich lamination or extrusion coating. The molded article can assume such a form as film, sheet, parison or pipe for forming bottle or tube, or preform for forming bottle or tube. The bottle or tube can be easily formed from the parison, pipe or preform by pinching the extruded article using a pair of split molds and blowing a fluid thereinto. After cooled, the pipe or the preform is heated at a drawing temperature and is drawn in the axial direction and is further blow-drawn in the circumferential direction by the fluid pressure thereby to obtain a bottle that is drawn and blown. Moreover, the film or the sheet is subjected to the vacuum molding, compressed air molding, bulging molding or plug-assisted molding in order to obtain a packaging container in the form of a cup, a tray or the like. The multi-layer films are overlapped one upon the other like a bag or are folded, and the peripheries thereof are heat-sealed to obtain a bag-like container. Moreover, the multi-layer films are cut into a predetermined shape to obtain a flexible lid for being heat-sealed.

In the embodiments shown FIGS. 1 and 2, the oxygen-absorbing resin layer is provided with the container body. But the resin layer can be provided with the container lid.

In producing the packaged food according to the present invention, it is important that one side of the container is transparent to the light when the container after filled with the content is irradiated with the light from the outer side. In the case of the package of the shape of a cup or a tray, for example, it is important that at least one side of the container body or the lid is transparent. The container may be opaque on the side opposite to the side being irradiated with the light, as a matter of course. Therefore, one side of the container or the lid may be formed by an opaque laminate that includes a metal foil.

As the metal foil, there can be used a foil of various surface-treated steels or a foil of light metals such as aluminum or the like. As the foil of the surface-treated steel, there can be used a foil of a cold-rolled steel in its own form or after it is annealed and secondarily cold-rolled followed by one kind or two or more kinds of the surface treatments such as zinc plating, tin plating, nickel plating, electrochromate treatment and chromate treatment. A preferred example of the surface-treated steel foil is the foil of the electrochromate-treated steel and, particularly, the one having a metal chromium layer of 10 to 200 mg/m$^2$ and a chromate layer of 1 to 50 mg/m$^2$ (in terms of metal chromium) and featuring excellent adhesiveness to resin and corrosion resistance in combination.

Another example of the surface-treated steel foil is a soft or hard tin plate foil plated with tin in an amount of 0.5 to 11.2 g/m$^2$. It is desired that the tin plate foil is treated with chromate or chromate/phosphate in an amount of 0.5 to 100 mg/m$^2$ in terms of metal chromium.

As the light metal foil, there can be used the foil of an aluminum alloy in addition to the foil of so-called pure aluminum.

In producing the packaged food using the container of the present invention, the container is filled with food which is the content and, as required, the interior of the container is deaerated or is substituted with water vapor or an inert gas such as nitrogen, followed by sealing. In the case of a pouch or a tube, the gas of the upper portion of the container is expelled, and the opening is closed and is heat-sealed. In the case of a cup-like or a tray-like container, the gas is substituted with the inert gas, and a heat-sealable lid is applied and is heat-sealed. In the case of a bottle, a cap is fitted and is sealed.

The heat sealing is effected by using a heat-seal bar, an ultrasonic sealing or a high-frequency sealing. The heat sealing is carried out at a temperature of, usually, from 140° to 230° C. which is higher than a softening point or a melting point of the resin on the inner surface of the container or the lid.

The container after sealed is irradiated with the light from the source of light. The source of light to be used should have spectral characteristics that are in agreement with the wavelengths absorbed by the photo-oxidatively degradable resin or absorbed by a composition of the photo-oxidatively degradable resin and the photo-oxidation promoting agent. There can be used a source of monochromatic light such as laser beam or the like in addition to a generally employed source of light such as high-pressure mercury lamp, low-pressure mercury lamp, halogen lamp and the like. It is desired that the intensity of light irradiation is generally from about 1.0 to about 200 mW/cm$^2$ though it may vary depending upon the amount of oxygen to be removed, and it is desired that the time of irradiation is from about one second to about 10 minutes. The container may be irradiated with the light from the whole surfaces or from the surface on one side. For example, the cup-like or tray-like container may be irradiated with the light from the side of the container or from the side of the lid.

After irradiated with the light, the sterilization is executed by hot water, boiling, retorting or hot packaging. In the sterilization by hot water or boiling, the packaged food is immersed in the hot water or in the boiling water to effect the sterilization usually at a temperature of 80° to 100° C. for 2 to 30 minutes. In the retort sterilization, the packages such as pouches or cups are introduced into a pressurized oven, and the sterilization is effected at a temperature of 100° to 130° C. for 2 to 20 minutes by using the heated water vapor or the heated water vapor and the heated air in combination. In the hot packaging, the content is charged into the container at a temperature of 60° to 95° C., and is sealed and is irradiated with the light. The package is then held in this state for about 1 to about 10 minutes to effect the sterilization. After sterilization, the package is immersed in the cold water or the cold water may be sprayed thereon to cool it at room temperature.

It should be understood that the plastic container of the present invention can be applied to even a so-called aseptic packaging method. In the aseptic packaging, the container is sterilized in advance with ozone, peracetic acid or hydrogen peroxide, and the content is passed through a heat exchanger to execute the sterilization by heating within short periods of time and is packaged and sealed. Here, by using the container of the present invention, oxygen remaining in the head space can be effectively removed.

In the foregoing was described an embodiment in which the content was introduced into the container, sealed, and was then irradiated with the light. When the polymer radicals formed by the irradiation with light remain relatively stably, then, the radicals can be utilized for absorbing oxygen via peroxy radicals; i.e., the radicals can be utilized for shutting off the permeation of oxygen through the wall of the container. Also, in prior to fill the content to the container, the irradiation with the light may be carried out. In this case, the light can be irradiated from inside or outside of the container.

EXAMPLES

The invention will now be described by way of Examples.

(Example 1)

A two-kind/three-layer sheet having an intermediate layer of a resin composition obtained by adding 200 ppm of benzyl as a photo-oxidation promoting agent to an ethylene-carbon monoxide copolymer with 3 carbonyl groups per 100 carbon atoms (hereinafter referred to as ECO3, NUCL-DHDA-1219 produced by Nippon Unicar Co.), and an inner layer and an outer layer of a straight-chain low-density polyethylene (PE) having an MI of 2 g/10 min(230° C.) (a total thickness of 0.9 mm, a constitution ratio of PE/ECO3/PE=4:1:4), was prepared by using a multi-layer sheet-forming machine constituted by an extruder/a feed block/a T-die/a cooling roll/a sheet take-up machine. The thus obtained sheet was heated at 190° C. and from which a cup-like container was formed having a mouth of a diameter of 60 mm, a height of 35 mm and a content of 100 cc by using a vacuum molding machine. Into the container was introduced 2 ml of distilled water, an aluminum foil-laminated heat-sealable lid was heat-adhered thereto in a nitrogen atmosphere and, then, the container was irradiated with the light through the bottom thereof using a high-pressure mercury lamp for two minutes. After sterilized with the hot water at 90° C. for 25 minutes, the oxygen concentration in the container was measured after every predetermined period of time. As a product for comparison, a cup of the same shape was prepared using a single PE layer and was subjected to the same processing and was measured. Permeation of oxygen was maintained at low levels during the sterilization by hot water. With the product of the present invention, oxygen permeated little during the sterilization. After the end of the sterilization, the oxygen concentration in the container was 0.20% in the case of the product of the present invention and was 1.5% in the case of the product for comparison. Favorable properties were maintained during the subsequent preservation in the container of this invention.

(Example 2)

A four-kind/seven-layer sheet having an intermediate layer of an ethylene-carbon monoxide copolymer with 1 carbonyl group per 100 carbon atoms (hereinafter referred to as ECO1, NUCL-2910 produced by Nippon Unicar Co.), another intermediate layer of an ethylene-vinyl alcohol copolymer (hereinafter referred to as EVOH, an ethylene content of 32 mol %, a saponification degree of 99.6 mol %), and an inner layer and an outer layer of a polypropylene-ethylene random copolymer (hereinafter referred to as PPR) having a melt index of 0.5 g/10 min. (230° C.), the layers being adhered with a maleic anhydride-modified PP (hereinafter referred to as ADH) having a melt index of 1.0 g/10 min.(a total thickness of 1.2 mm, a constitution ratio of PPR/ADH/ECO1/ADH/EVOH/ADH/PPR=25/1/4/1/4/1/25), was prepared by using a multi-layer sheet-forming machine constituted by an extruder/a feed block/a T-die/a cooling roll/a sheet take-up machine. The thus obtained sheet was heated at 190° C. and from which a cup-like container was formed in a manner that the ECO layer which is one of the intermediate layers was on the inside having a mouth of a diameter of 75 mm and a content of 180 ml by using a vacuum molding machine. Into the container was introduced 2 ml of distilled water, a lid made up of an aluminum foil and PP was heat-sealed thereto in a nitrogen atmosphere and, then, the container was irradiated with ultraviolet rays through the bottom thereof using a high-pressure mercury lamp for two minutes. Thereafter, the container was subjected to the retort processing at 120° C. for 30 minutes and was then preserved at 30° C. 80% RH to measure the oxygen concentration in the container after every predetermined period of time by using a gas chromatography. As a product for comparison, a cup of the same shape was prepared in the same manner as described above but without having the ECO layer, and was filled, sealed, irradiated and sterilized by heating in order to take measurement. The results were as shown in Table 1. The product of the present invention having the ECO layer exhibited superior effects to the product of comparison, and exhibited particularly distinguished effect in regard to suppressing the permeation of oxygen during the retorting. These effects stem from the fact that the ECO layer in the material of the container has absorbed oxygen.

(Example 3)

A resin composition obtained by mixing a polymethyl vinyl ketone and a straight-chain low-density polyethylene at a ratio of 1:5 and to which were further added 200 ppm of cobalt naphthenate and 200 ppm of acetophenone, was used as an intermediate layer (M), and to the inner and outer surfaces thereof were laminated a straight-chain low-density polyethylene of Example 1 in the same manner as described above. The sheet was of the two-kind/three-layer constitution (a total thickness of 0.15 mm, PE/M/PE=1:3:1). This sheet having an area of 25 cm² was irradiated with the light for 5 minutes using a 1-KW high-pressure mercury lamp and was introduced into a gas barrier container (content of 85 ml) together with 1 ml of distilled water, heat-sealed with a sealing material made up of aluminum foil/polypropylene, and was subjected to the retort processing at 120° C. for 20 minutes. After a predetermined period of time has passed, the oxygen concentration in the container was measured to find the amount of oxygen absorbed by the sheet. A sheet for comparison without the intermediate layer was measured in the same manner as described above. The product of the present invention exhibited oxygen-absorbing property as shown in Table 2, from which it is expected that the oxygen barrier property of the container can be improved.

(Example 4)

A cup-like container was formed by using a sheet having an intermediate layer of a resin composition obtained by blending an ethylene-carbon monoxide copolymer with three carbonyl groups per 100 carbon atoms (NUCL-DHDA-1219 produced by Nippon Unicar Co.) with 1 part by weight of Michler's ketone as a photo-oxidation promoting agent, having another intermediate layer and inner and outer layers as well as adhesive layers which were the same as those mentioned in Example 2. Then, the container was filled, sealed, irradiated with the light and sterilized in the same manner as described above and was preserved under the conditions of a temperature of 22° C. and 60% RH to measure the gas composition in the container every after a predetermined period of time. As will be obvious from the results shown in Table 1, the container suppressed the permeation of oxygen during the sterilization by heating and thereafter.

(Example 5)

The plastic multi-layer container of Example 2 was filled with 90 g of pineapple immersed in syrup (flesh 55 g, syrup 35 g) under the conditions of being substituted with nitrogen, and to which a closure made up of PET/aluminum foil/PP was heat-sealed. Then, the container was irradiated with ultraviolet rays through the barrel thereof using a 1-KW high-pressure mercury lamp for 5 minutes. The container was then sterilized with the hot water heated at 90° C. for 15 minutes and was preserved under the conditions of 22° C. and 60% RH to examine the quality every after a predetermined period of time. As products for comparison, the same containers as that of the present invention were tested but without being irradiated with the light or without having the ECO1 layer of the invention. As will be obvious from the results shown in Table 3, the products of the present invention irradiated with the light make it possible to improve preservability of the content.

TABLE 1

| | Oxygen concentration in the container % | | | | |
|---|---|---|---|---|---|
| | Immediately after retorting | 1 week | 2 weeks | 1 month | 3 months |
| Example 2 (*1) | 0.00 | 0.03 | 0.31 | 0.45 | 0.88 |
| Example 2 (*2) | 0.61 | 1.08 | 1.60 | 2.05 | 4.14 |
| Example 4 (*1) | 0.00 | 0.01 | 0.16 | 0.30 | 0.53 |

*1: product of the invention
*2: product for comparison

TABLE 2

| | Amount of absorbing oxygen (ml/25 cm²) | | | |
|---|---|---|---|---|
| | Immediately after retorting | 1 week | 2 weeks | 1 month |
| Example 3 (*1) | 0.45 | 0.85 | 1.2 | 1.4 |
| Example 3 (*2) | 0 | 0 | 0 | 0 |

*1: product of the invention
*2: product for comparison

TABLE 3

| | Irradi-ation of light | Oxygen concentration in the container (%) | | | | Taste** after preserved for 1 month |
|---|---|---|---|---|---|---|
| | | 1 week | 2 weeks | 1 month | 3 months | |
| Example 5 (*1) | yes | 0.0 | 0.3 | 0.5 | 0.9 | 5 |
| Example 5 (*1) | no | 0.5 | 0.9 | 1.6 | 2.9 | 3 |
| Example 5 (*2) | yes | 1.0 | 1.6 | 2.1 | 4.1 | 2 |
| Example 5 (*2) | no | 1.0 | 1.6 | 2.1 | 4.1 | 2 |

*1: product of the invention
*2: product for comparison
**: Test . . . evaluated in 5 steps.

In the container of the present invention, the layer for absorbing oxygen remaining in the container is composed of a photo-oxidatively degradable resin or a photo-oxidatively degradable resin and a photo-oxidation promoting agent in combination to absorb ultraviolet rays and visible light, and is irradiated with the light at a requirement timing in order to form polymer radicals. Then, oxygen remaining in the container is effectively absorbed via peroxy radicals to which oxygen is attached. Accordingly, oxygen in the container is effectively removed, and the content is prevented from being degraded contributing to preserving the taste and flavor of the content.

According to the present invention, ultraviolet rays and visible light are used for forming polymer radicals that serve as active sites for absorbing oxygen. Unlike the containers irradiated with ionizing radioactive rays, therefore, the timing for irradiating the container with the light is not limited to before being filled with the content; i.e., the container can be irradiated with the ultraviolet rays and visible light after it is filled with the content and is sealed. This makes it possible to very effectively absorb oxygen remaining in the container via polymer radicals.

Moreover, what is required is a light irradiation facility only, and no protective facility is needed. Therefore, operation is simple, cost of facility can be decreased, and enhanced safety is maintained.

It is advantageous to irradiate the container with ultraviolet rays and visible light after it has been filled with the content and sealed followed by sterilization by heating from the standpoint of retaining flavor of the content. That is, trapping the oxygen via polymer radicals is promoted with an increase in the temperature that results from the sterilization by heating, and residual oxygen is almost all trapped before it attacks the content. Therefore, flavor of the content is maintained at a high level even after the sterilization.

I claim:

1. A heat-sterilizable multi-layer plastic container comprising an oxygen absorbing layer and a gas barrier layer which is located on an outer side of said oxygen absorbing layer, wherein said oxygen absorbing layer comprises:

a photo-oxidation degradable resin capable of absorbing ultraviolet rays and visible light and selected from the group consisting of a styrene-carbon monoxide copolymer or an ethylene-carbon monoxide copolymer; and a photo-oxidation promoting agent comprising an α-ketocarbonyl compound, and wherein the combination of said oxygen absorbing layer and said gas barrier layer has an oxygen permeation coefficient of not larger than $10^{-12}$ cc.cm/cm².sec.cmHg at 20° C. and 0% RH.

2. A heat-sterilizable multi-layer plastic container according to claim 1, wherein the photo-oxidation degradable resin comprises 1 to 20 carbonyl groups per 100 carbon atoms.

3. A heat-sterilizable multi-layer plastic container according to one of claims 1 or 2, wherein the oxygen absorbing layer further comprises other resins in addition to the photo-oxidation degradable resin.

4. A heat-sterilizable multi-layer plastic container according to claim 3, wherein the other resin is an olefin resin.

5. A heat-sterilizable multi-layer plastic container according to claim 1, wherein the photo-oxidation promoting agent is present in an amount of 0.1 to 5 parts by weight per 100 parts by weight of the photo-oxidation degradable resin.

6. A heat-sterilizable multi-layer plastic container according to claim 1, further comprising an inner layer having oxygen permeating property and being water-insoluble provided on an inside of the oxygen absorbing layer.

7. A heat-sterilizable multi-layer plastic container according to claim 1, further comprising an outer resin layer for protection which is water-insoluble provided on an outside of the gas barrier layer.

* * * * *